United States Patent
Tondolo

(10) Patent No.: US 8,201,580 B2
(45) Date of Patent: Jun. 19, 2012

(54) HIGH FLOW CAPACITY POSITIONER

(75) Inventor: Flavio Tondolo, Stezzano BG (IT)

(73) Assignee: STI srl, Bergamo (IT)

( * ) Notice: Subject to any disclaimer, the term of this patent is extended or adjusted under 35 U.S.C. 154(b) by 820 days.

(21) Appl. No.: 12/200,597

(22) Filed: Aug. 28, 2008

(65) Prior Publication Data

US 2009/0178713 A1 Jul. 16, 2009

Related U.S. Application Data

(60) Provisional application No. 61/011,035, filed on Jan. 14, 2008.

(51) Int. Cl.
*F16K 11/07* (2006.01)

(52) U.S. Cl. ............. 137/625.66; 137/625.69; 251/85

(58) Field of Classification Search ............ 137/625.64, 137/625.66, 625.69; 251/85, 129.19

See application file for complete search history.

(56) References Cited

U.S. PATENT DOCUMENTS

| | | | |
|---|---|---|---|
| 2,276,591 A | | 7/1940 | Ray |
| 2,520,386 A | * | 8/1950 | Dillman ................. 251/61.4 |
| 2,761,646 A | * | 9/1956 | Cyril ........................ 137/494 |
| 3,089,509 A | * | 5/1963 | Collins ................... 137/454.6 |
| 3,625,246 A | * | 12/1971 | Reaves ..................... 137/408 |
| 4,190,081 A | | 2/1980 | Coles |
| 4,951,549 A | | 8/1990 | Olsen et al. |
| 6,237,617 B1 | | 5/2001 | Sturman et al. |
| 6,505,642 B2 | * | 1/2003 | Miyazoe et al. ............. 137/554 |
| 6,923,212 B2 | | 8/2005 | Tranovich et al. |
| 7,066,189 B2 | | 6/2006 | Tranovich et al. |

FOREIGN PATENT DOCUMENTS

| | | |
|---|---|---|
| EP | 0583781 | 2/1994 |
| GB | 766865 | 1/1957 |

OTHER PUBLICATIONS

Written Opinion of PCT/IB2009/050036.

* cited by examiner

*Primary Examiner* — Craig Schneider
(74) *Attorney, Agent, or Firm* — Stetina Brunda Garred & Brucker

(57) ABSTRACT

A valve positioner for controlling a valve closure element is provided. The positioner includes a positioner housing with a plurality of fluid flow passageways in fluid communication with a fluid supply source and the valve closure element. The positioner housing is configured to receive a detachable spool manifold assembly. The spool manifold assembly is positioned adjacent the plurality of fluid flow passageways. The spool manifold assembly includes a reciprocally moveable spool configured to selectively port fluid flow from the plurality of fluid flow passageways. The spool manifold assembly includes a diaphragm connected to the spool via a flexible shaft. The diaphragm is in fluid communication with a transducer for receiving a fluid causing the diaphragm to expand or contract and thereby displacing the spool. The flexible shaft is radially elastic in order to minimize axial backlash between the diaphragm and the spool. The flexible shaft configuration minimizes the spool stroke.

20 Claims, 8 Drawing Sheets

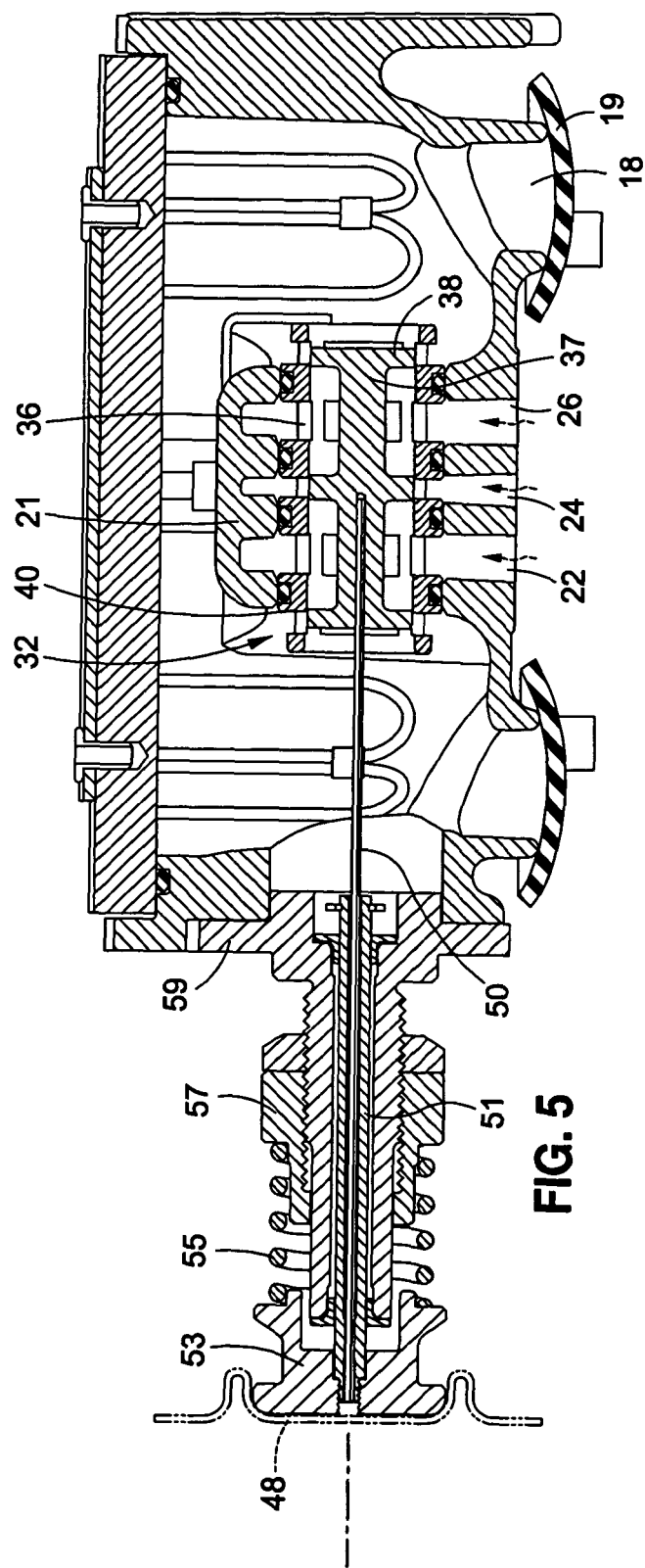
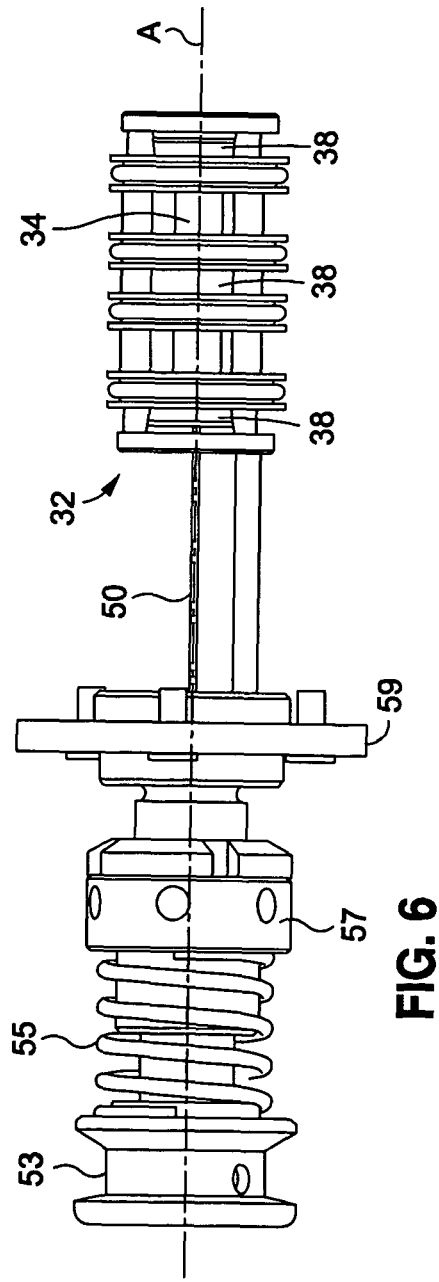
FIG. 5
FIG. 6

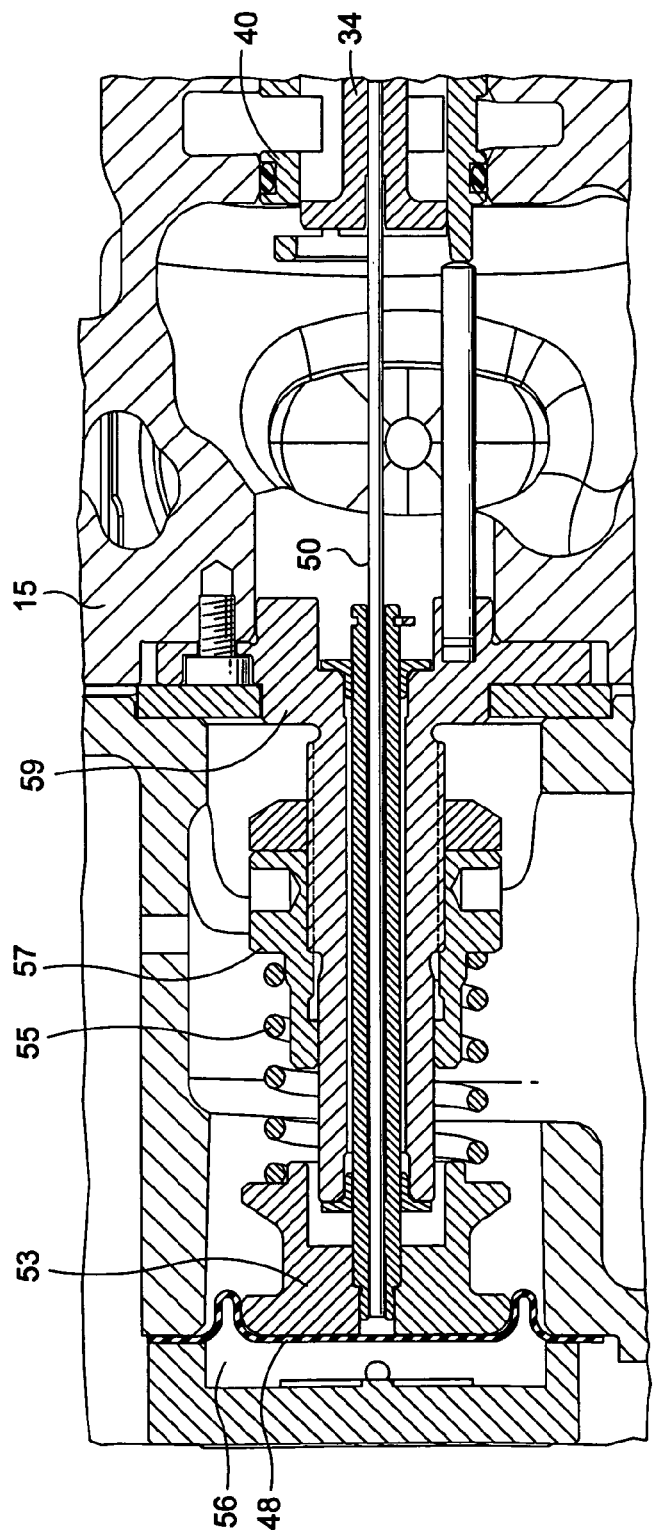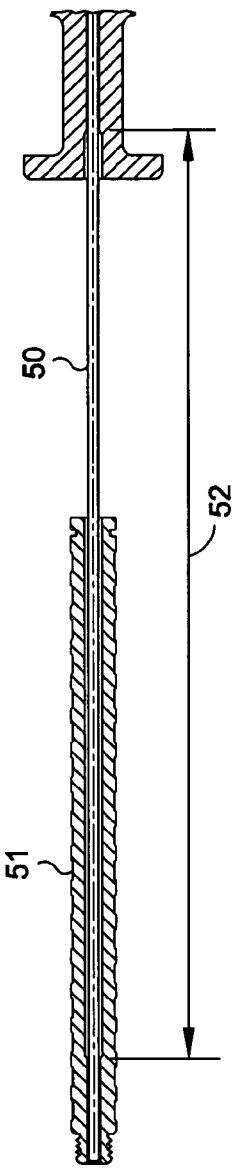
FIG. 7
FIG. 8

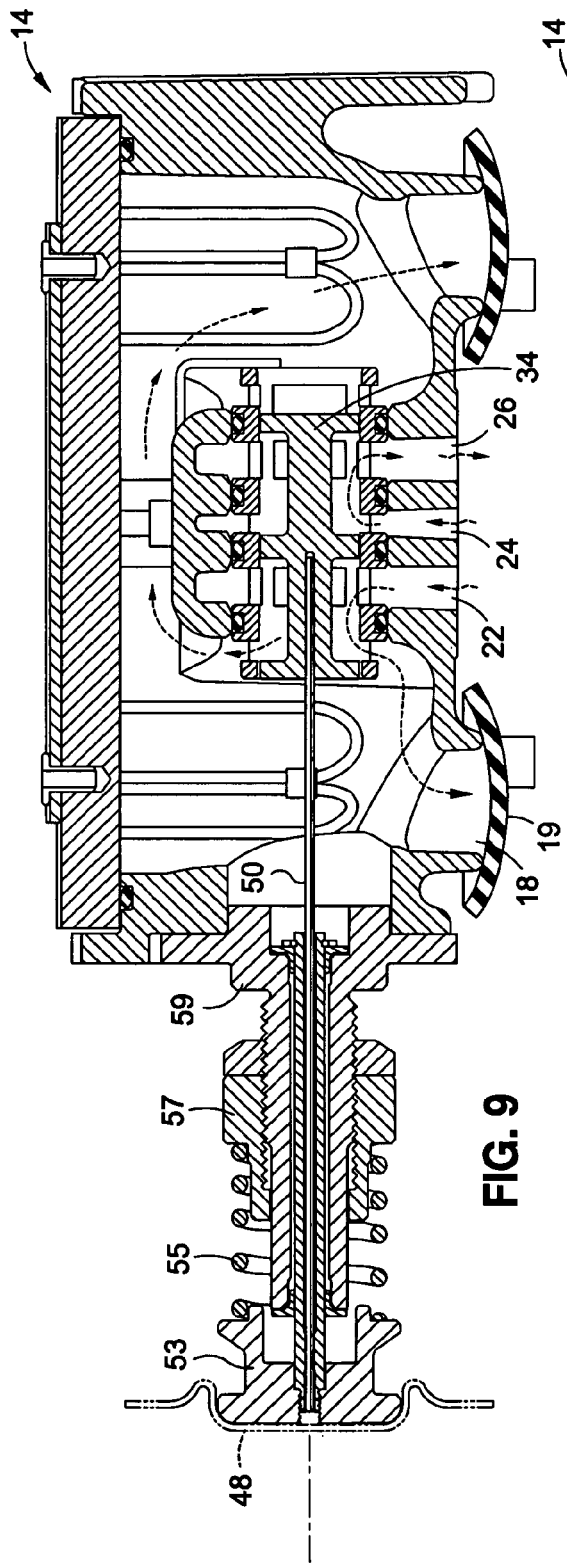
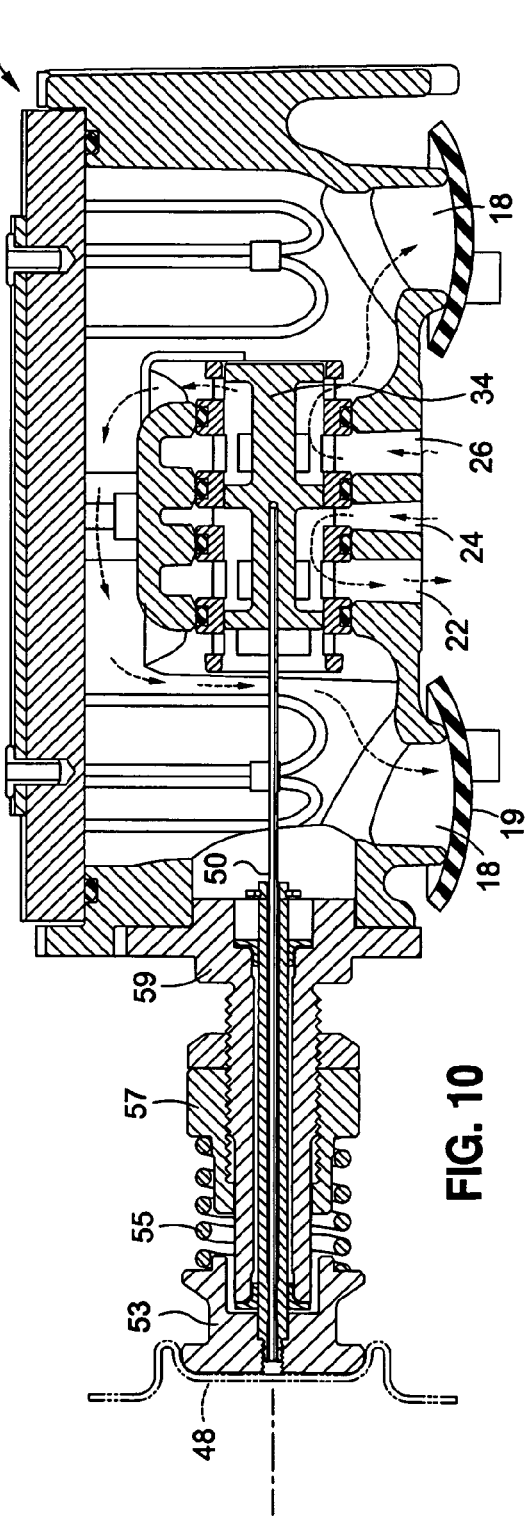

HIGH FLOW CAPACITY POSITIONER

CROSS-REFERENCE TO RELATED APPLICATIONS

The present application claims priority to U.S. Provisional Application No. 61/011,035 filed Jan. 14, 2008, the disclosure of which is incorporated herein by reference.

STATEMENT RE: FEDERALLY SPONSORED RESEARCH/DEVELOPMENT

Not Applicable

BACKGROUND OF THE INVENTION

1. Technical Field of the Invention

The present invention relates generally to fluid flow control and, more particularly, to a high flow capacity positioner for regulating fluid flow within a fluid circuit.

2. Description of the Related Art

A control valve regulates a flowing fluid, such as gas, steam, water, or chemical compounds. An actuator may be used to regulate the flow of fluid within a control valve. The actuator provides motive power to open or close the valve and therefore regulate the fluid flow within the valve.

A valve positioner is a device mounted on the actuator that may implement a control strategy determined by an output of a controller in electrical communication with the valve positioner. The controller provides a variable current signal to the valve positioner. The variable current signal is proportional to the state of the valve positioner. For example, a valve positioner may fully open a valve in response to a 4 milliamp (mA) current signal and fully close the valve in response to a 20 mA current signal. The valve positioner compares the current signal to the actuator's position to provide the motive force necessary to move the actuator accordingly. If the current signal differs from the actuator's position, the valve positioner moves the actuator until the correct position is reached. Valve positioners are well known in the art. Two types of well-known positioners include a single-acting pneumatic positioner which sends air and exhausts air from one side of the actuator that is opposed by a range spring, and a double-acting pneumatic positioner which sends air and exhaust air from both sides of the actuator. Valve positioners have been greatly improved upon through the use of digital devices that use microprocessors to position the actuator, monitor key variables, and implement control algorithms and record data.

The actuator converts energy in the form of compressed air into motion including linear or rotary motion. The actuator is configured to receive a large volume flow of air in order to be displaced to a desired position for regulating fluid flow. There are well known advantages for using compressed air rather than hydraulics to provide motive force to the actuator. These advantages include exhausting air rather than oil into the atmosphere. Using compressed air is also better suited for absorbing excessive force. Furthermore, stored air may be used when power to the valve positioner is lost. Additionally, minimal maintenance is required for actuators that are dependent upon the use of compressed air. Using a valve positioner to control the movement of the actuator by communicating microprocessor-based current is widespread for enhanced accuracy and efficiency. The ability to more accurately and efficiently control the actuator is due in large part to the controller of the valve positioner. As indicated above, the controller is known to receive feedback of the valve travel position and adjust the current that is representative of the desired actuator position for controlling a particular process. Valve positioners are known to convert the current signal outputted by the controller into a pressure signal used to supply the actuator with a quantifiable amount of compressed air. Valve position feedback is critical to the operation of the valve positioner. Without feedback, the control valve may default to its failsafe position or a random position.

The ability of the valve positioner to precisely regulate the flow rate of fluid within a fluid circuit is an important characteristic. The valve positioner is employed to move the actuator which is conventionally comprised of a piston sealed within a cylinder. The valve positioner moves the piston by forcing compressed air into one end of the cylinder while simultaneously withdrawing or exhausting the compressed air out of an opposing end of the cylinder. Valve positioners are most often used in closed-loop systems where the position of the actuator, and velocity and/or pressure of the compressed air flowing within the valve positioner, is continuously monitored with a feedback device which generates system feedback signals. The controller uses the system feedback signals to generate current signals that are received by the valve positioner to minimize the error between a desired position of the piston and an actual position of the piston within the cylinder.

Valve positioners generally incorporate a spool that either rotates or slides axially in a housing to port the compressed air flow to the actuator or direct air flow from the actuator to one or more exhaust ports. However, for valve positioner systems adapted for providing high fluid flow rates, relatively large spools are incorporated into the positioner. Larger spools require relatively large moments of inertia, necessitating the employment of a stepper motor having relatively high torque output. Displacing a large spool using an electric motor means that the device needs a separate power source. Valve positioners that use stepper motors typically position the spool in an open-loop fashion wherein the spool must be initialized. Positioning the spool in an open-loop design is more susceptible to delay than a closed-loop design and is not recommended for applications requiring increased accuracy and efficiency. During initialization, the spool is moved to a starting point or initialization position from where the stepper motor may initiate movement of the spool to a desired position. The controller may command the stepper motor to move the spool so that the controller may track a sequence of current signals from the initialization position and maintain a virtual spool position in its memory. As long as the stepper motor precisely tracks the sequence of driver signals, the error between the desired position and the actual position of the piston of the actuator is minimized. Using a stepper motor to displace the spool has well known disadvantages. The torque of the motor may generate unwanted spool rotation. Displacing the spool using a stepper motor may also contribute to misalignment between a thrust axis and the spool axis having a negative impact on the accuracy of the valve positioner.

Another well-known method used to move the spool within the valve positioner is the use of a pressure responsive diaphragm. The diaphragm is capable of receiving fluid pressure in the form of compressed air to exert a force on the spool, causing the spool to move. The diaphragm is also configured to release air to exert a force in an opposite direction from the direction of spool movement. Therefore, the diaphragm may be used to move the spool bi-directionally relative to a housing in which the spool is disposed. However, diaphragms are not recommended when higher flow capacity is desired. Higher flow capacity requires larger spools, which require more force to move the spool. Under this circumstance, using a pressure responsive diaphragm may not be feasible. This presents the dilemma of whether to use the stepper motor to displace a larger spool for increased flow capacity or to use the pressure responsive diaphragm to displace a smaller sized spool. The desired flow capacity may influence whether the stepper motor or the pressure responsive diaphragm is used.

Valve positioner performance can be rated based upon flow capacity. Flow capacity is measured by the flow coefficient ($C_v$). $C_v$ is linearly related to the flow capacity of the valve positioner. For example, an increase in the $C_v$ corresponds to an increased flow capacity. The flow coefficient of a device is a relative measure of its efficiency of fluid flow within a fluid circuit. The $C_v$ describes the relationship between the pressure drop across a fluid circuit and the corresponding flow rate. The $C_v$ is the volume (US Gallons) of water at 60 degrees Fahrenheit that will flow per minute through a valve with a pressure drop of 1 pound per square inch (psi) across the valve. For example, $C_v=22$ means 22 gallons of water at 60 degrees Fahrenheit will flow through a valve with a pressure drop of 1 psi across the valve. The use of the $C_v$ offers a standard method of comparing valve capacities and sizing valves for specific applications that are widely accepted in a particular industry.

Often valve positioners with greater flow capacity are preferred because of their ability to move a greater amount of fluid. However, a valve positioner system with increased flow capacity is more expensive and complex to manufacture. Increased flow capacity is associated with faster spool stroke times. The faster the spool stroke time, the faster the actuator must be driven to a desired position. Additionally, faster spool stroke time is associated with better frequency response. Faster spool stroke time translates into better response to a small current signal change. Alternatively, slower spool stroke time correlates to a reduced flow capacity rating. The longer it takes for the spool to move from one position to another position, the longer it takes to drive the actuator to the desired position. Longer spool stroke time results in reduced frequency response and therefore a reduced ability to respond to smaller changes in the current signal from the controller. Minimizing the range in which the spool may move is one method that may be employed for faster spool stroke time. However, faster spool stroke time may result in decreased accuracy. Thus, for applications where accuracy is of greater importance, it may be desirable to reduce the spool stroke time for better spool positioning accuracy.

Improving a valve positioner system for widespread use requires attention to various factors including, for example, manufacturing costs, power consumption and flow capacity. The power consumption associated with a valve positioner is typically associated with a current loop source. The current loop is a communication interface that uses current instead of voltage for signaling from the controller to the valve positioner. A popular and widely used industry standard includes a 4-20 mA current loop range. Thus, it is important for the valve positioner to function effectively within the 4-20 mA current source.

Increasing the flow capacity of the valve positioner requires a larger spool with faster spool stroking time. The force required to move the larger spool faster is greater. Faster spool stroke time for a particular range of spool movement requires greater thrust, which in turn requires more power. The increase in force may be compensated by increasing the power consumption of the valve positioner. However, maintaining the power consumption contemplated by a 4-20 mA current loop is also an important consideration because of its wide use in industry. If the power consumed requires a current loop source greater than 4-20 mA, the valve positioner may not be accepted for certain applications that rely on the 4-20 mA standards. Therefore, commercial success of the valve positioner system may hinge on remaining within the industry wide standard of 4-20 mA current loops.

Designing a high flow capacity positioner system within a particular cost and power consumption range is limited in some respects. A well-known method used to increase the flow capacity of a valve positioner includes the use of boosters. Boosters amplify the volume of air supplied to the actuator. Although valve positioners fitted with boosters provide more $C_v$ capacity, the disadvantages include a significant decrease in control quality. In this regard, the boosters are mechanical-pneumatic flow amplifiers driven by positioner flow with intrinsic lag time. As a result, a high amplification ratio gives rise to instability, with a low amplification ratio often not meeting dynamic performance requirements. The addition of boosters also includes the addition of piping and fittings resulting in an increase in cost and parts. The extra parts make maintenance more difficult, also there is potential increase in the risk of malfunctions and/or leakages. Furthermore, boosters must be calibrated and adjusted which takes time and money.

Accordingly, there exists a need in the art for a valve positioner which addresses one or more of the above or related deficiencies.

SUMMARY OF THE INVENTION

The present invention specifically addresses and alleviates the above-identified deficiencies in the art. In this regard, the present invention is directed to a spool manifold assembly for operative coupling to a valve positioner. The spool manifold assembly is used to port fluid to and from a valve closure element such as an actuator. The spool manifold assembly includes a housing having a plurality of openings for receiving and exhausting air flowing from a plurality of fluid flow passageways. The plurality of openings on the housing are substantially aligned with the plurality of fluid flow passageways when the spool manifold assembly is coupled to the valve positioner. A tubular sleeve is disposed within the housing. The tubular sleeve includes a plurality of apertures configured to receive fluid flowing from corresponding ones of the fluid flow passageways. The spool manifold assembly also includes a spool disposed within the tubular sleeve. The spool slides axially along a longitudinal axis to port fluid to the fluid flow passageways and an exhaust port. The spool manifold assembly also includes a flexible shaft. The flexible shaft is designed to minimize spool displacement between an unbalanced position and a balanced (neutral) position. The unbalanced spool position corresponds to fluid flowing to the actuator or valve closure element, while the balanced spool position prevents fluid from being exhausted from the spool manifold assembly. The flexible shaft includes two opposing ends. The first end is coupled to the spool and the second end is coupled to a diaphragm. The second end of the flexible shaft extends away from the housing along the longitudinal axis. The diaphragm, the flexible shaft, and the spool are all aligned along the longitudinal axis. When the fluid pressure against the diaphragm is increased, the diaphragm expands and exerts a motive force on the flexible shaft causing the spool to displace a prescribed distance. When the fluid pressure against the diaphragm is decreased the diaphragm contracts also causing the spool to displace in the opposite direction at a prescribed distance.

In one embodiment, the spool includes a main body portion that is of a first diameter. The spool also includes a plurality of cylindrically shaped lobes extending radially from the main body portion and equidistantly spaced apart. The lobes are of a second diameter that is greater than the first diameter of the main body portion. The cylindrically shaped lobes are configured to block or prevent the flow of fluid to at least one aperture associated with the tubular sleeve depending upon the spool position of the spool. The spool is operative to allow the flow of fluid from at least one of the fluid flow passageways to the actuator when the spool is in the unbalanced position. The spool may also include a bore extending axially within the main body portion of the spool along the longitudinal axis. The bore is sized to receive the first end of the flexible shaft.

In yet another embodiment, the spool manifold assembly includes a biasing spring disposed between the diaphragm and the housing. The biasing spring may be positioned adjacent a portion of the flexible shaft. The biasing spring is configured to exert a force on the diaphragm. When the force exerted on the diaphragm by the fluid pressure is equal to the force exerted by the biasing spring, the spool remains in a balanced or neutral position. However, if the pressure against the diaphragm is either increased or decreased to the point where the biasing spring is over-whelmed or under-whelmed, the spool moves to an unbalanced position. In one embodiment, a significant portion of the flexible shaft is disposed within an elongate sleeve. The elongate sleeve is configured to minimize the lateral displacement of the flexible shaft. The first end and the second end of the flexible shaft define an axially rigid joint. The flexible shaft is designed to be radially elastic to minimize axial backlash when the spool is displaced.

The present invention is also directed to a valve positioner. The valve positioner is used to control an actuator to regulate the fluid flowing within a fluid circuit. The valve positioner includes a positioner housing. Disposed within the positioner housing is a positioner microprocessor. The positioner microprocessor is configured to receive an input signal representative of an actuator position. The input signal may be a current signal ranging between 4 mA and 20 mA. The input signal may be transmitted to the positioner microprocessor from a controller. Also disposed within the positioner housing are a plurality of fluid flow passageways. Adjacent the plurality of fluid flow passageways is a spool manifold assembly. The spool manifold assembly includes a reciprocally moveable spool configured to selectively port fluid flow from the fluid flow passageways to the actuator. A flexible shaft is used to connect the spool to a diaphragm. A transducer is also disposed within the positioner housing. The transducer is in fluid communication with the diaphragm and in electrical communication with the microprocessor. The transducer is configured to receive a pneumatic signal which is operative to regulate the fluid supplied to the diaphragm for displacing the spool.

The microprocessor may use a set of control algorithms to compare the input signal to the actuator position. The microprocessor generates a pneumatic signal used to minimize the difference between the input signal and the actuator position. Each of the plurality of fluid flow passageways disposed within the positioner housing is optimized by gradually decreasing the width as they extend toward the spool manifold assembly. At least one of the fluid flow passageways is configured to receive fluid flow from a pressurized fluid flow supply source. The pressurized fluid flow supply source may be disposed exterior to the positioner housing. In another embodiment, the pressurized fluid flow supply source may be disposed within the positioner housing. The positioner housing may also include dual exhaust ports. Each exhaust port may also include a flexible diaphragm. The valve positioner may also include a feedback mechanism coupled to the actuator and in electrical communication with the positioner microprocessor. The feedback mechanism includes a shaft for absorbing load generated by the actuator. The feedback mechanism also includes a sensor elastically mounted and independent from the shaft to prevent absorption of unwanted load generated by the actuator. The feedback mechanism is configured to transmit a feedback signal to the positioner microprocessor. The feedback signal may be representative of a pressure change or position change associated with the actuator.

In another embodiment, a method for regulating fluid flowing within a fluid circuit is provided. The method includes receiving an input signal on a positioner microprocessor disposed within the positioner. The positioner includes a positioner housing having a plurality of fluid flow passageways, and a spool manifold assembly disposed within the housing. The spool manifold assembly includes a spool for selectively porting fluid flow from the plurality of fluid flow passageways to an actuator. The method continues by comparing the input signal to the actuator position and generating a pneumatic signal. The pneumatic signal is then transmitted to a transducer disposed within the housing. A diaphragm is then supplied with fluid from the transducer. The diaphragm is also in mechanical communication with the spool. The method continues with displacing the spool relative to the housing for regulating the fluid flow to the actuator in response to a change in pressure associated with the diaphragm. A feedback signal representative of a pressure differential within the actuator is generated. The feedback signal is generated using a feedback mechanism coupled to the actuator and in electrical communication with the positioner microprocessor. The method may repeat the above described steps until the actuator position corresponds to the received input signal.

The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which:

FIG. 4 is a side elevational view of the positioner system constructed in accordance with the present invention;

FIG. 5 is a cross-sectional view of the spool manifold assembly shown in FIG. 2, depicting the spool of the spool manifold assembly in a neutral position;

FIG. 6 is a side elevational view of a portion of the spool manifold assembly, depicting a diaphragm linked to the spool via a flexible shaft;

FIG. 7 is a partial cross-sectional view of the spool manifold assembly, depicting the diaphragm and the flexible shaft thereof;

FIG. 8 is an enlarged, partial cross-sectional view of the flexible shaft of the spool manifold assembly;

FIG. 9 is a cross-sectional view of the spool manifold assembly, depicting the spool thereof in a flow position;

FIG. 10 is a cross-sectional view of the spool manifold assembly, depicting the spool thereof in a flow position;

DETAILED DESCRIPTION OF THE INVENTION

Figure 1:
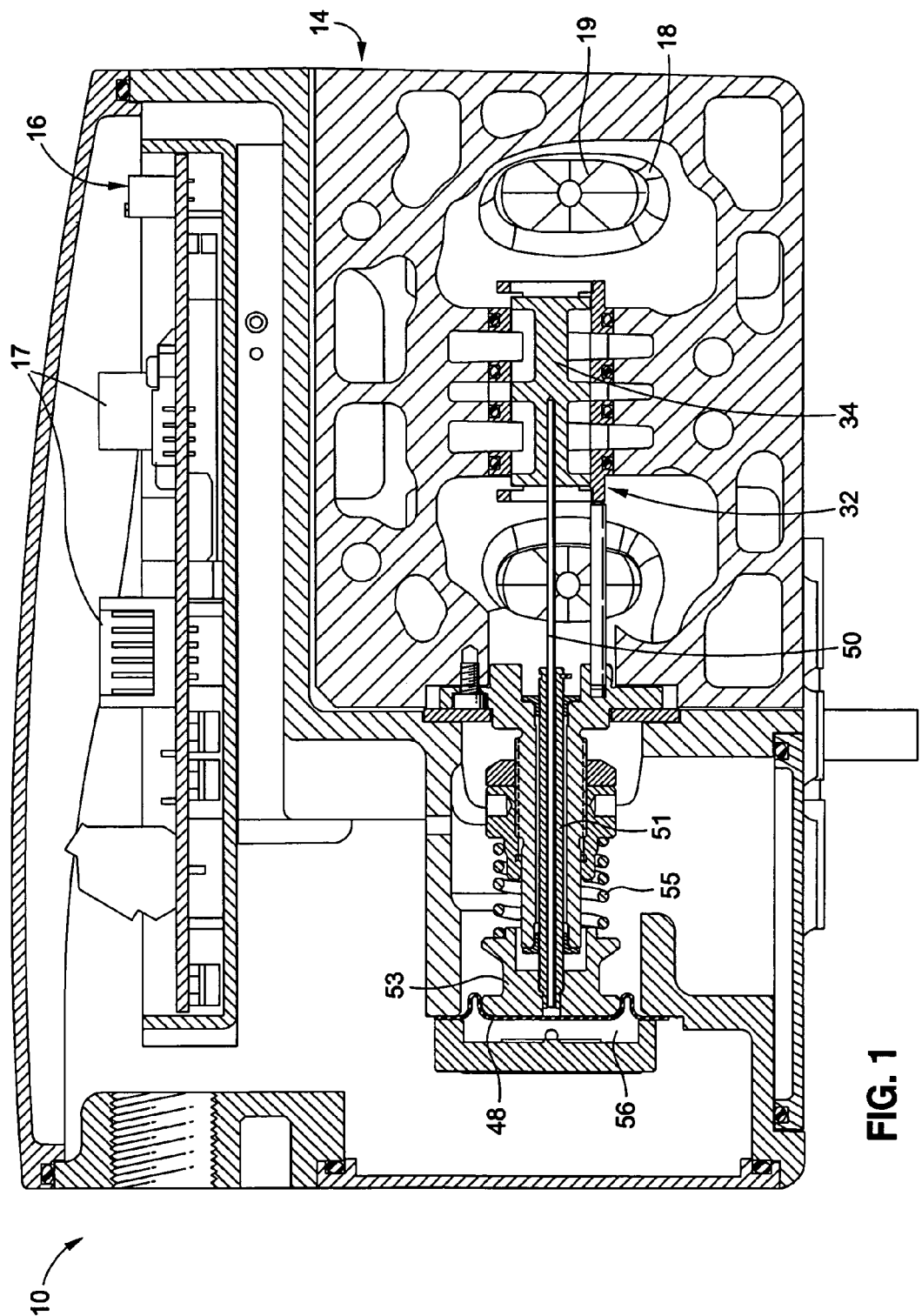
FIG. 1 is a cross-sectional view of a positioner system constructed in accordance with the present invention.

Referring now to the drawings wherein the showings are for purposes of illustrating an embodiment of the present invention and not for purposes of limiting the same, FIG. 1 illustrates a positioner 10 constructed in accordance with the present invention. The positioner 10 includes a spool manifold assembly 14, and a printed circuit board (PCB) assembly 16 incorporating electrical components 17. The role of the positioner 10 is that of a position controller (servomechanism) that is mechanically connected to an actuator (not shown). The positioner 10 is configured to adjust its output to the actuator to maintain a desired position of the actuator in proportion to an input current signal. Therefore, the positioner 10 is employed to provide the motive force necessary to displace the actuator to a desired position in order to open or close the valve to which the actuator is connected to.

The spool manifold assembly 14 is an integral part of the positioner 10. The spool manifold assembly 14 ports the flow of compressed air to the actuator. The spool manifold assembly 14 may also direct air exhausted from the actuator into exhaust ports 18. The spool manifold assembly 14 may direct the flow of compressed air to the actuator while simultaneously exhausting fluid pressure to the exhaust ports 18. The flow of fluid will refer to the flow of compressed air throughout the detailed description. However, it is contemplated that the flow of fluid may refer to a medium other than compressed air such as gas or any other applicable fluid. The use of compressed air throughout the detailed description represents only one embodiment of the present invention and does not place any limitation on the type of fluid to be used with the present invention. The exhaust ports 18 of the positioner 10 may release the compressed air exhausted by the actuator into the atmosphere exterior to the positioner 10.

The PCB assembly 16 houses the electrical components 17 of the positioner 10. It is contemplated that the PCB assembly 16 is isolated from the spool manifold assembly 14. In this respect, the PCB assembly 16 is housed in a waterproof enclosure for protection of the sensitive electrical components 17. The PCB assembly 16 may include a microprocessor for processing control algorithms used to control various outputs of the positioner 10. In one embodiment, it is contemplated that the PCB assembly 16 is encapsulated in a tray with a protective silicon coating.

Figure 2:
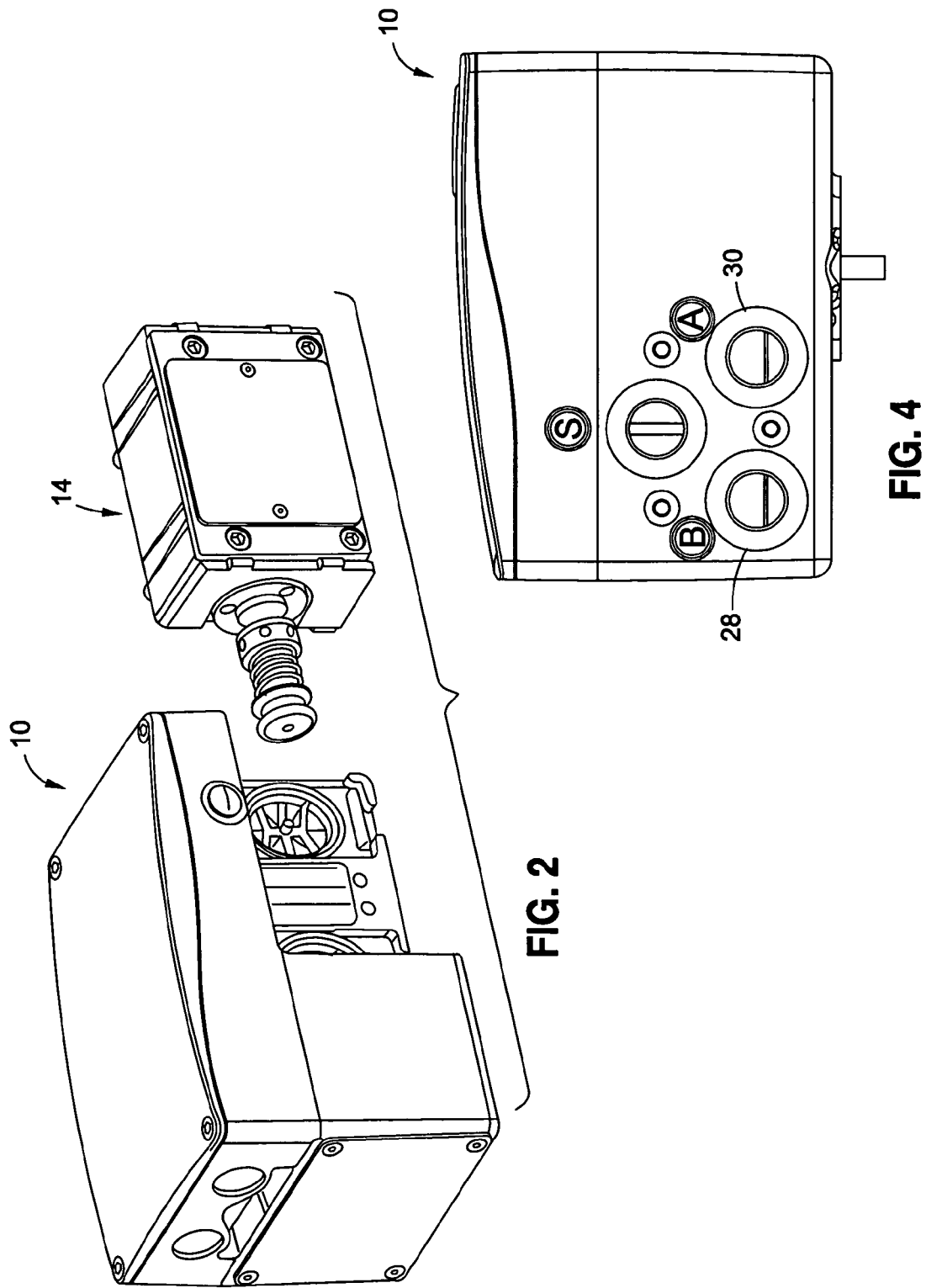
FIG. 2 is an exploded view of the positioner system, depicting the spool manifold assembly of the positioner system as detached from the remainder thereof.

Referring briefly now to FIG. 2, the spool manifold assembly 14 is detachable from the positioner 10. In this respect, the spool manifold assembly 14 may be removed from the positioner 10. The spool manifold assembly 14 is removable from the positioner 10 for inspection of the spool manifold assembly 14 and its various parts as will be described in further detail below. Upon inspection it may be determined that the spool manifold assembly 14 must be replaced due to wear from excessive use. The inspection may reveal that routine maintenance rather than replacement is required. The ability to detach the spool manifold assembly 14 allows for cleaning of the spool manifold assembly 14. The option of removing the spool manifold assembly 14 from the positioner 10 is a cost effective and time saving measure. Additionally, the spool manifold assembly 14 is an integral part with respect to the accuracy and efficiency of the positioner system 10. Even a miniscule amount of dirt or wear within the spool manifold assembly 14 may negatively impact the accuracy and efficiency of the positioner 10. Thus, the ability to remove the spool assembly 14 from the positioner 10 without removing the entirety of the positioner 10 from its operative environment is desirable.

Referring back to FIG. 1, the positioner 10 includes two exhaust ports 18 as indicated above. The spool manifold assembly 14 is configured to port fluid flow from the actuator to the exhaust ports 18 for releasing the fluid flow from the positioner 10 into the atmosphere. A flexible diaphragm sheet 19 may be coupled to each exhaust port 18. The flexible diaphragm sheets 19 function similar to a check valve to prevent water, dust, and other debris from entering sensitive areas of the spool manifold assembly 14 or the positioner 10 in general. With regard to the environmental protection attributes of the present invention, the same is particularly suited for use in conjunction with control valves which are installed in harsh environments with the presence of tropical rain, dust and/or sand. Though most valve positioner systems experience complications with water entering the exhaust ports thereof, water entering the interior portion of the positioner 10 is not detrimental to the safety or functionality thereof. In this regard, the positioner 10 meets the IP 66 protection class. Additionally, the positioner 10 is designed to prevent or minimize water entering its interior through the exhaust ports 18. The flexible diaphragm sheets 19 are used as seals to prevent water from entering the exhaust ports 18, but still allow for the free release of air or another fluid from the exhaust ports 18 to the atmosphere.

Figure 3:
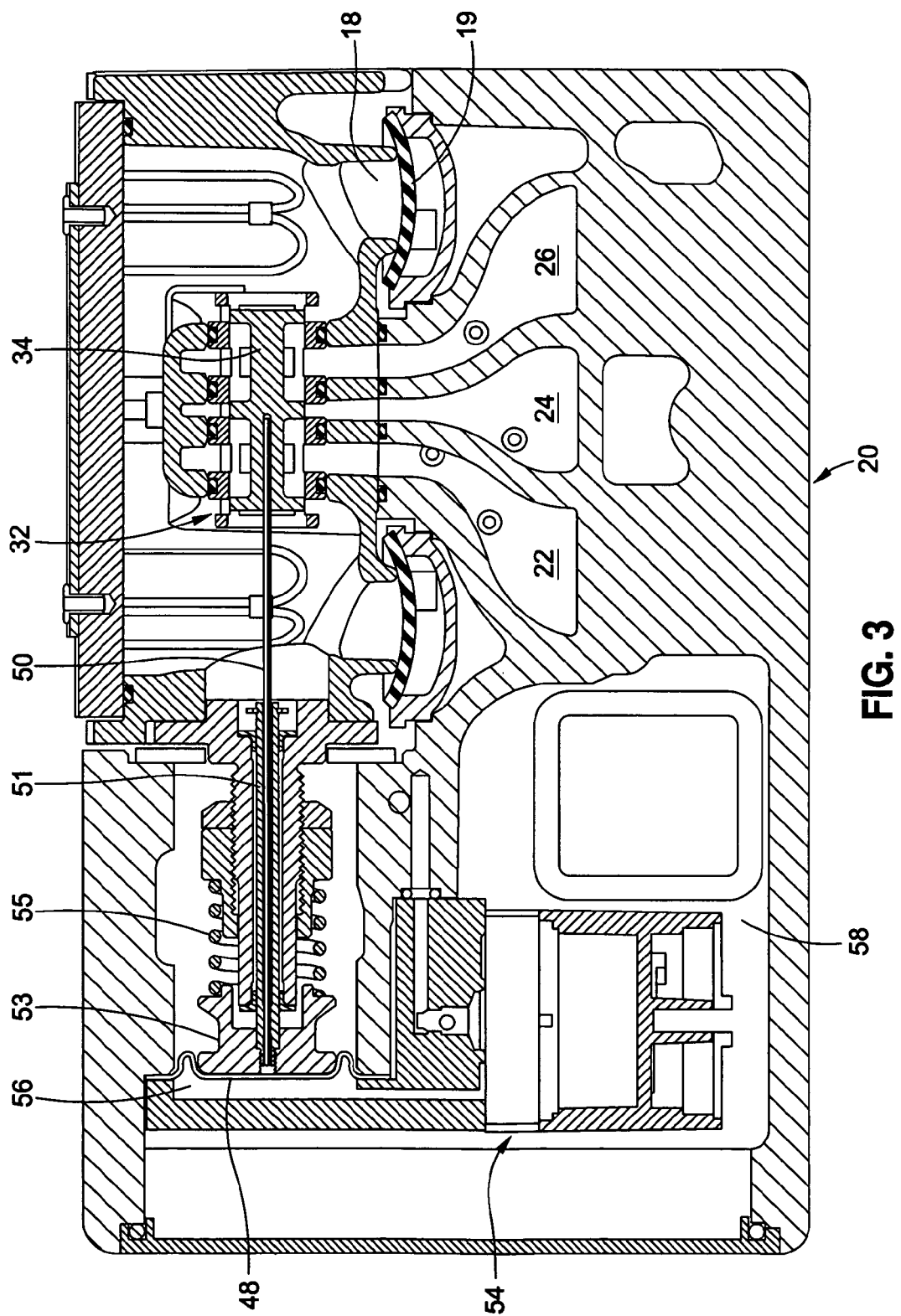
FIG. 3 is a cross-sectional view of the positioner of the positioner system constructed in accordance with the present invention, the positioner including the spool manifold assembly.

Referring now to FIG. 3, the positioner 10 includes a positioner housing 20 with the spool manifold assembly 14 disposed therein. Disposed within the positioner housing 20 are a plurality of fluid flow passageways 22, 24, 26. There are three fluid flow passageways 22, 24, 26. The center fluid flow passageway 24 is connected to a source of compressed air in the form of a pressure supply. The pressure supply connected to the center fluid flow passageway 24 may be disposed within the positioner housing 20. In another embodiment, the pressure supply connected to the center fluid flow passageway 24 is located exterior to the positioner 10. The fluid flow passageways 22 and 26 are fluidly connected to actuator chamber connection ports 28, 30 shown in FIG. 4, such ports 28, 30 in turn being fluidly connected to the actuator. More particularly, the actuator chamber connection ports 28, 30 are fluidly connected to the fluid flow passageways 22, 26, respectively, to receive compressed air therefrom. Alternatively, the actuator chamber connection ports 28, 30 are configured to supply respective ones of the fluid flow passageways 22, 26 with air exhausted from the actuator in order to be directed to the exhaust ports 18. The ability of the actuator chamber connection ports 28, 30 to either supply or receive air flow from the fluid flow passageways 22, 26 is dependent upon the position of a spool assembly 32 of the spool manifold assembly 14, and in particular a spool 34 of the spool assembly 32. The spool 34 is configured to port the flow of air into the actuator chamber connection ports 28, 30 or the exhaust ports 18, as will be described in more detail below.

Referring now to FIGS. 5, 6, 9 and 10, the spool assembly 32 is effectively interfaced to the fluid flow passageways 22, 24, 26 to port compressed air to a prescribed location for manipulating the actuator and thus the fluid flow within a fluid circuit. The spool 34 is adapted to slide axially within the spool assembly 32 as needed to effectuate fluid flow through the spool assembly 32 in a prescribed manner. In the spool assembly 32, the spool 34 includes a main body portion 37 which defines a longitudinal axis A. Extending radially outward from the main body portion 37 are three cylindrically shaped lobes 38 which are arranged in equidistantly spaced intervals. In this regard, the main body portion 37 is of a first diameter, with each of the lobes 38 being of a second diameter which exceeds the first diameter. In addition to the spool 34, the spool assembly 32 comprises a hollow, tubular sleeve 36. In the spool assembly 32, the spool 34 is concentrically positioned within and slideably moveable along the longitudinal axis A to prescribed positions relative to the sleeve 36. As seen in FIGS. 5, 9 and 10, the sleeve 36 does not define a continuous outer wall, but rather defines three separate openings which are aligned with respective ones of the fluid flow passageways 22, 24, 26 when the sleeve 36 is operatively mounted within the interior of the positioner housing 20. In this regard, the positioner housing 20 includes an internal wall portion 21 which, in addition to defining the fluid flow passageways 22, 24, 26, further defines wall segments which are abutted against those portions of the sleeve 26 extending adjacent to and between the openings defined thereby. As is further seen in FIGS. 5, 9 and 10, those portions of the sleeve 36 extending adjacent to and between the openings thereof each include an outer annular groove which accommodates a sealing member such as an O-ring 40, the O-rings 40 in turn being brought into sealed engagement with those segments of the internal wall portion 21 abutted against the sleeve 36.

In the spool assembly 32, the spool 34 is selectively moveable between a neutral or balanced position, and two separate unbalanced positions. In FIG. 5, the spool 34 is shown in its neutral position. In FIG. 9, the spool 32 is shown in one of its two unbalanced positions, with the other of the two unbalanced positions being shown in FIG. 10. When the spool 32 is in either of its unbalanced positions, the lobes 38 are generally aligned with certain ones of the fluid flow passageways 22, 24, 26 such that fluid is selectively ported to and from the actuator in a prescribed manner. When the spool 34 is moved to its balanced position shown in FIG. 5, the movement of the actuator is neutralized. The arrow depicted in the center fluid flow passageway 24 in FIG. 5 represents the compressed air supplied by the pressure supply source. When the spool 34 is in its neutral position, the compressed air is prevented from flowing to the actuation chamber ports 28, 30 via the fluid flow passageways 22, 26 due to the center lobe 38 of the spool 32 effectively blocking the opening of the sleeve 36 which communicates with the center fluid flow passageway 24. The arrows shown in the fluid flow passageways 22, 26 in FIG. 5 represent the air that is exhausted from the actuator into the actuation chamber connection ports 28, 30 when the spool 34 is in its neutral position. The flow of air through the fluid flow passageways 22, 26 as depicted in FIG. 5 is also effectively blocked from flowing into the open interior of the positioner housing 20 and thereafter to atmosphere via the exhaust ports 18 by the outer pair of lobes 38 of the spool 34. More particularly, as seen in FIG. 5, though exhaust air is able to flow through the fluid flow passageways 22, 26 and into the voids defined between each adjacent pair of the lobes 38, the outer pair of the lobes 38 effectively block those openings within the sleeve 36 which would, if unblocked, allow the exhaust air to flow from the sleeve 36, into the open interior of the positioner housing 20 and outwardly to atmosphere via the exhaust ports 18 and diaphragms 19 operatively interfaced thereto.

To assume its unbalanced position as shown in FIG. 9, the spool 34 moves along the longitudinal axis A from the neutral position shown in FIG. 5 in a direction to the left when viewed from the perspective shown in FIG. 9. When in this particular unbalanced position, the central lobe 38 effectively unblocks that opening of the sleeve 36 communicating with the fluid flow passageway 24, thus allowing pressurized air or another fluid to flow from the fluid flow passageway 24 and into the fluid flow passageway 26 in the manner depicted by the arrows included in the fluid flow passageways 24, 26 in FIG. 9. As will be recognized, the pressurized fluid flowing through the fluid flow passageway 24 and thereafter into the fluid flow passageway 26 is channeled to the actuator chamber connection port 30 and thereafter to the actuator. At the same time, air exhausted from the actuator into the actuator chamber connection port 28 and thereafter into the fluid flow passageway 22 is effectively routed through now unblocked openings of the sleeve 36 adjacent the left most lobe 38 and into the open interior of the positioner housing 20 before eventually venting to atmosphere via the exhaust ports 18 in the manner also depicted by the arrows in FIG. 9.

To assume its unbalanced position as shown in FIG. 10, the spool 34 moves along the longitudinal axis A from the neutral position shown in FIG. 5 in a direction to the right when viewed from the perspective shown in FIG. 10. When in this particular unbalanced position, the central lobe 38 effectively unblocks that opening of the sleeve 36 communicating with the fluid flow passageway 24, thus allowing pressurized air or another fluid to flow from the fluid flow passageway 24 and into the fluid flow passageway 22 in the manner depicted by the arrows included in the fluid flow passageways 22, 24 in FIG. 10. As will be recognized, the pressurized fluid flowing through the fluid flow passageway 24 and thereafter into the fluid flow passageway 22 is channeled to the actuator chamber connection port 28 and thereafter to the actuator. At the same time, air exhausted from the actuator into the actuator chamber connection port 30 and thereafter into the fluid flow passageway 26 is effectively routed through now unblocked openings of the sleeve 36 adjacent the right most lobe 38 and into the open interior of the positioner housing 20 before eventually venting to atmosphere via the exhaust ports 18 in the manner also depicted by the arrows in FIG. 10.

As will be recognized by those of ordinary skill in the art, the movement of the spool 34 between the neutral position and each of the unbalanced positions shown in respective ones of FIGS. 5, 9 and 10 is operative to effectively port air to and from the actuator as needed to facilitate the movement of the actuator in a prescribed manner. As indicated above, the actuator is in turn coupled to the valve closure element, and provides the motive force needed to effectively actuate the valve closure element as needed to regulate fluid flow in the fluid circuit in a prescribed manner.

As best shown in FIG. 3 and as indicated above, the fluid flow passageways 22, 24, 26 of the positioner housing 20 are optimized for maximizing the flow capacity of the positioner 10. Such optimization is related to the shape of the fluid flow passageways 22, 24, 26. In particular, the width of the fluid flow passageways 22, 24, 26 decreases as such fluid flow passageways 22, 24, 26 approach the spool 34. However, the fluid flow passageways 22, 24, 26 are of greatest width where the source of air flow is initially introduced thereinto. For example, the fluid flow passageways 22, 26 are wider where air exhausted from the actuator is introduced thereinto from respective ones of the actuator chamber connection ports 28, 30. Similarly, the center fluid flow passageway 24 is widest where compressed air is introduced thereinto from the pressure supply source. The narrowing of the fluid flow passageways 22, 24, 26 as occurs as they approach the spool 34 effectively reduces the required stroking range of the spool 34. Such reduced stroking range results in the spool 34 being capable of achieving a fast stroke time between the neutral (no flow) position and either of the unbalanced (flow) positions highlighted above. The dimensions of the spool 34 are also able to be reduced as a result of the narrowing of the fluid flow passageways 22, 24, 26. Further, the reduction in the width of the fluid flow passageways 22, 24, 26 minimizes the pressure drop across the spool assembly 32. Minimizing the pressure drop across the spool assembly 32 allows the actuator to receive or exhaust air quickly and efficiently. The greater the pressure supply to the actuator upon the movement of the spool 34 to one of its unbalanced, flow positions, the faster the actuator stroking time. Faster actuator stroking applies quicker opening and closing of the valve closure element for regulating the fluid flow within the fluid circuit.

The optimized fluid flow passageways 22, 24, 26 disposed within the positioner housing 20 compliment the design of the high capacity spool 34. The dimensions of the spool 34 are important to the efficiency and accuracy under the most strenuous conditions. If the optimized fluid flow passageways 22, 24, 26 are not narrowed at the interface with the spool assembly 32, the spool dimensions 34 which would otherwise be required to block or prevent the flow of compressed air to the actuator and exhaust ports 18 would necessarily have to be much greater in size. However, such greater dimensions of the spool 34 and thus the corresponding spool assembly 32 would result in a greater mass of the spool 34. An increased mass of the spool 34 would in turn give rise to a greater amount of inertia. This increased amount of inertia would in turn require an increased amount of power to be consumed by the positioner 10. Thus, any increase in the dimensions of the spool 34 is undesirable. Rather, reducing the dimensions of the spool 34 to the maximum extent without reducing the flow coefficient of the positioner 10 is preferred, and is achieved by the present invention. As indicated above, reducing the dimensions of the spool 34 effectively reduces the mass thereof, thereby increasing its stroke time and positively effecting the inherent flow characteristics in which a maximum flow coefficient is achieved with minimal movement of the spool 34.

The spool 34 will be fabricated from a material that minimizes the mass thereof. As indicated above, the force required to displace the spool 34 is reduced when the mass of the spool 34 is minimized. As a result, the power required to displace the spool 34 is also reduced. The spool 34 may be fabricated from a reduced friction material, with such reduced friction being beneficial to the kinematics of the spool 34 during displacement thereof along the longitudinal axis A. The spool is fabricated from material which reduces the necessary force required to overcome any friction between the spool 34 and the sleeve 36 in which it is concentrically positioned. Static friction between the spool 34 and the sleeve 36 can be a major cause of dead band in the spool assembly 32. Thus, minimizing the friction between the spool 34 and the sleeve 36 within which the spool 34 is slidably disposed reduces the deadband effect. By way of example only and not limitation, the spool 34 may be fabricated from an aluminum alloy, stainless steel, a ceramic, or a polymeric, all of which may be provided with or without surface treatment. As also indicated above, the configuration of the spool assembly 32 contemplates a short stroke for the spool 34. In one embodiment, the range of the stroke of the spool 34 is approximately two millimeters. It is contemplated that the stroke range for the spool 34 from its neutral position to either of its unbalanced, flow positions is approximately ½ the width of the center spool lobe 38. Although the stroke of the spool 34 is short, the positioner 10 is capable of maintaining a high capacity flow coefficient. Effectively, the spool manifold assembly 14 including the spool assembly 32 in combination with the optimized fluid flow passageways 22, 24, 26 and other elements within the positioner housing 20 compliment the ability of the spool 34 to respond to high frequency variations. A high frequency response is important when driving the spool 34 using a small pressure responsive diaphragm 48, the specific attributes of which will be discussed in more detail below. In one embodiment, the spool frequency response is approximately 6 Hz. The ability of the spool 34 to respond to small frequency variations contributes to the high flow capacity of the positioner 10.

As seen in FIGS. 3 and 5-10, the spool manifold assembly 14 further includes an elongate, flexible shaft 50 which is used to operatively couple the spool 34 to the above-identified pressure responsive diaphragm 48 of the positioner 10. The flexible shaft 50 has a first end portion which is received and rigidly secured within a complimentary opening extending axially within the main body portion 37 of the spool 34 along the longitudinal axis A defined thereby. The rigid interface of the flexible shaft 50 to the spool 34 defines an axially rigid joint. Of that portion of the shaft 50 not advanced into the spool 34, a significant portion of the length thereof is disposed within an elongate sleeve 51. The sleeve 51 effectively minimizes the lateral displacement of the shaft 50 as will be discussed in more detail below. The sleeve 51 is itself advanced through a coupling member 59 which is in turn attached to an interior support surface or spool manifold block 15 of the positioner housing 20. A distal portion of the sleeve 51 protruding from the coupling member 59 is advanced into a complimentary bore of and rigidly secured to a diaphragm support member 53. The diaphragm support member 53 also defines a cavity which is coaxially aligned with the sleeve 51 and accommodates a distal portion of the coupling member 59. The rigid interface of the shaft 50 to the diaphragm support member 53 via the sleeve 51 also defines an axially rigid joint.

As further seen in FIGS. 3, 5-7, 9 and 10, mounted to the exterior of the coupling member 59 is an annular spring bushing 57. Abutted against and extending between the diaphragm support member 53 and the spring bushing 57 is a biasing member, and more particularly a helical biasing spring 55. In this regard, the diaphragm support member 53 and the spring bushing 57 are each specifically configured to effectively maintain the biasing spring 55 in its operative position extending therebetween. The biasing spring 55 normally biases the diaphragm support member 53 toward the diaphragm 48 and thus away from the spool 34.

The movement of the spool 34 between its neutral and each of its unbalanced, flow positions is driven by the movement of the shaft 50 along the longitudinal axis A. The movement of the shaft 50 is in turn influenced by the pressure exerted by the diaphragm 48 against the diaphragm support member 53 which, as indicated above, is rigidly attached to the shaft 50 via the sleeve 51. If no pressure is exerted by the diaphragm 48 against the diaphragm support member 53, thus resulting in the absence of any pushing force being applied to the shaft 50, the spool 34 will assume its unbalanced position as shown in FIG. 9. In this regard, the spool 34 is driven to the left most extent of its available stroke as viewed from the perspective in FIG. 9 as a result of the biasing force exerted against the diaphragm support member 53 by the biasing spring 55. The movement of the spool 34 from the unbalanced position shown in FIG. 9 to the neutral position shown in FIG. 5 is facilitated by the application of pressure to the diaphragm 48 at a level sufficient to facilitate a small incremental movement of the support member 53 to the right as viewed from the perspective shown in FIG. 9. As will be recognized, the pressure exerted against the diaphragm support member 53 by the diaphragm 48 to facilitate this incremental movement must be sufficient to overcome the biasing force normally exerted by the biasing spring 55 against the diaphragm support member 53, and thus cause a resultant compression of the biasing spring 55.

As will also be recognized by those of ordinary skill in the art, causing the spool 34 to assume the unbalanced, flow position shown in FIG. 10 requires that the amount of pressure exerted by the diaphragm 48 against the diaphragm support member 53 be increased as needed to overcome the biasing force exerted by the biasing spring 55 to achieve further movement of the spool 34 to the right relative to its neutral position when viewed from the perspective shown in FIG. 5. The abutment of the distal end of the coupling member 59 against the diaphragm support member 53 provides a stop which limits further movement of the spool 34 to the right, after it assumes the unbalanced position shown in FIG. 10 upon the requisite pushing force being exerted thereon by the shaft 50. The flexible shaft 50 of the present invention is an integral portion of the driving linkage design for the spool 34. As indicated above, the shaft 50 effectively couples the spool 34 to the pressure responsive diaphragm 48. The shaft 50 provides a flexible spool/diaphragm coupling.

The flexible coupling of the spool 34 to the diaphragm 48 facilitated by the shaft 50 minimizes friction caused by relatively small misalignments between the spool 34 and the diaphragm 48 when the spool 34 is displaced axially to a prescribed position as a result of pressure exerted on the diaphragm 48. Small misalignments between the longitudinal axis A of the spool 34 and the thrust axis of the diaphragm 48 are difficult to avoid. However, it is important to drive the spool 34 smoothly, regardless of any misalignments between the aforementioned axes. It is contemplated that the linking or coupling of the spool 34 and the diaphragm 48 by the radially elastic but axially rigid joint facilitated by the shaft 50 will prevent or at the very least minimize axial backlash or axial play. Such elastic radial joint also results in lower minimal thrust which in turn reduces axial backlash. Due to the inherent elastic radial joint provided by the flexible shaft 50, linear displacement along the longitudinal axis A results in very low thrust and no axial backlash. Axial backlash is a form of deadband that results from a temporary discontinuity between input and output of a device when the input of the device changes direction. Slack or looseness of a mechanical connection is a typical example. The flexible shaft 50 is designed to minimize the slack between the diaphragm 48 and the spool 34. At the same time, excessive lateral displacement of the shaft 50 is limited by the sleeve 51. The limitation of the maximum lateral displacement of the shaft 50 facilitated by the sleeve 51 is advantageous and desirable since it prevents the shaft 50 from buckling. Further, the elastic properties of the shaft 50 allow for a long free deflection length which is represented by the reference number 52 in FIG. 8. The shaft 50 has the ability to withstand more than fifty newtons (N) of compressive thrust, which is an extremely high capacity considering typical compression thrust is very often less than ION for a comparable positioner.

The shaft 50 is also adapted to reduce the range at which the spool 34 must be displaced linearly along the longitudinal axis A to move from its neutral, balanced, no-flow position to one of its unbalanced, flow positions. The reduced range of the spool 34 translates to a shorter stroke of the spool 34. The shorter spool stroke minimizes the spool stroking time as indicated above, thus resulting in an improved spool frequency response. The positioner 10 of has improved response to an input current signal with frequency variations when the stroking time of the spool 34 is minimized. This is especially important when the variants of the input signal are minimal, therefore requiring added sensitivity to a small frequency variation.

As indicated above, the diaphragm 48 is disposed within the positioner housing 20 and is a flexible pressure responsive element that transmits force to the flexible shaft 50 in response to receiving compressed air from a transducer 54 of the positioner 10. It is contemplated that the transducer 54 is a current to pressure converter, and is fluidly coupled to a rear diaphragm compartment 56 which is defined within the interior of the positioner housing 20. As will be recognized, and as is shown in FIG. 3, the diaphragm 48 effectively creates a sealed, fluid-tight barrier between the compartment 56 and the diaphragm support member 53. Upon receiving a current signal, the transducer 54 is operative to supply the compartment 56 with compressed air. As the air pressure within the compartment 56 builds, such air pressure exerts a force on the diaphragm 48 to overcome the opposing force of the biasing spring 55. As explained above, the force exerted upon the diaphragm 48 is transferred to the diaphragm support member 53 and in turn to the flexible shaft 50 via the sleeve 51. The transmission of force to the shaft 50 causes a thrusting motion or pushing along the longitudinal axis A, thereby displacing the spool 34 to either of the positions shown in respective ones of FIGS. 5 and 10. As previously explained, the absence of any air pressure within the compartment 56, coupled with the action of the biasing spring 50, causes the spool 34 to assume to the unbalanced position shown in FIG. 9. The introduction of air or other fluid pressure into the compartment 56 at a first level will facilitate the movement of the spool 34 to its neutral position shown in FIG. 5, with the further increase in the pressure level within the compartment 56 to a second level exceeding the first level facilitating the further incremental movement of the spool 34 to its other unbalanced position as shown in FIG. 10. Again, any further increases in the pressure level within the compartment 56 beyond the second level does not facilitate any further movement of the spool 34 beyond the position shown in FIG. 10 as a result of the mechanical stop created between the coupling member 59 and the diaphragm support member 53.

In the positioner 10, the compartment 56, as well as the diaphragm 48, are disposed within the positioner housing 20 so as to be removed from any back pressure influence of the exhaust ports 18. In this regard, the position of the diaphragm 48 within the positioner housing 20 relative to the exhaust ports 18 is selected to prevent or minimize any axial load on the diaphragm 48. For example, though the exhaust back pressure influence emanating from the exhaust ports 18 may exceed six bar, the placement of the diaphragm 48 within the positioner housing 20 is such that the pressure exerted on the diaphragm 48 is typically less than two bar.

The transducer 54 of the positioner 10 has the capability of receiving a direct electrical input signal from the microprocessor 72. The transducer 54 may use a torque motor, nozzle-flapper, and pneumatic relay to convert the electrical or current signal to a proportional pneumatic output signal. Nozzle pressure operates the relay and is piped to the torque motor feedback bellows to provide a comparison between the input signal and nozzle pressure. The transducer 54 is preferably positioned within a waterproof, sealed compartment 58 defined within the interior of the positioner housing 20 to protect it from harsh environments and the exhaust pressure influence of the exhaust ports 18.

The positioner 10 may be used to facilitate the control of both single-acting and double-acting actuators with linear and rotary mountings. A conventional double-acting actuator comprises a sliding sealed plate or piston which is disposed inside a pressurized retaining cylinder to provide double-acting operation. For the double-acting actuator, air is supplied to either side of the piston by the positioner 10. More particularly, the positioner 10 may deliver compressed air to one side of the piston while effectively allowing air to be vented from the other side until a prescribed position of the piston is reached. A spring may be included in the cylinder of the double-acting actuator to serve as a fail safe mechanism. The actuator, whether single-acting or double-acting, can be used in conjunction with either linear or rotary valves. Linear designs are efficient since the entire movement of the actuator is transferred directly to a valve stem of the valve.

Figure 11:
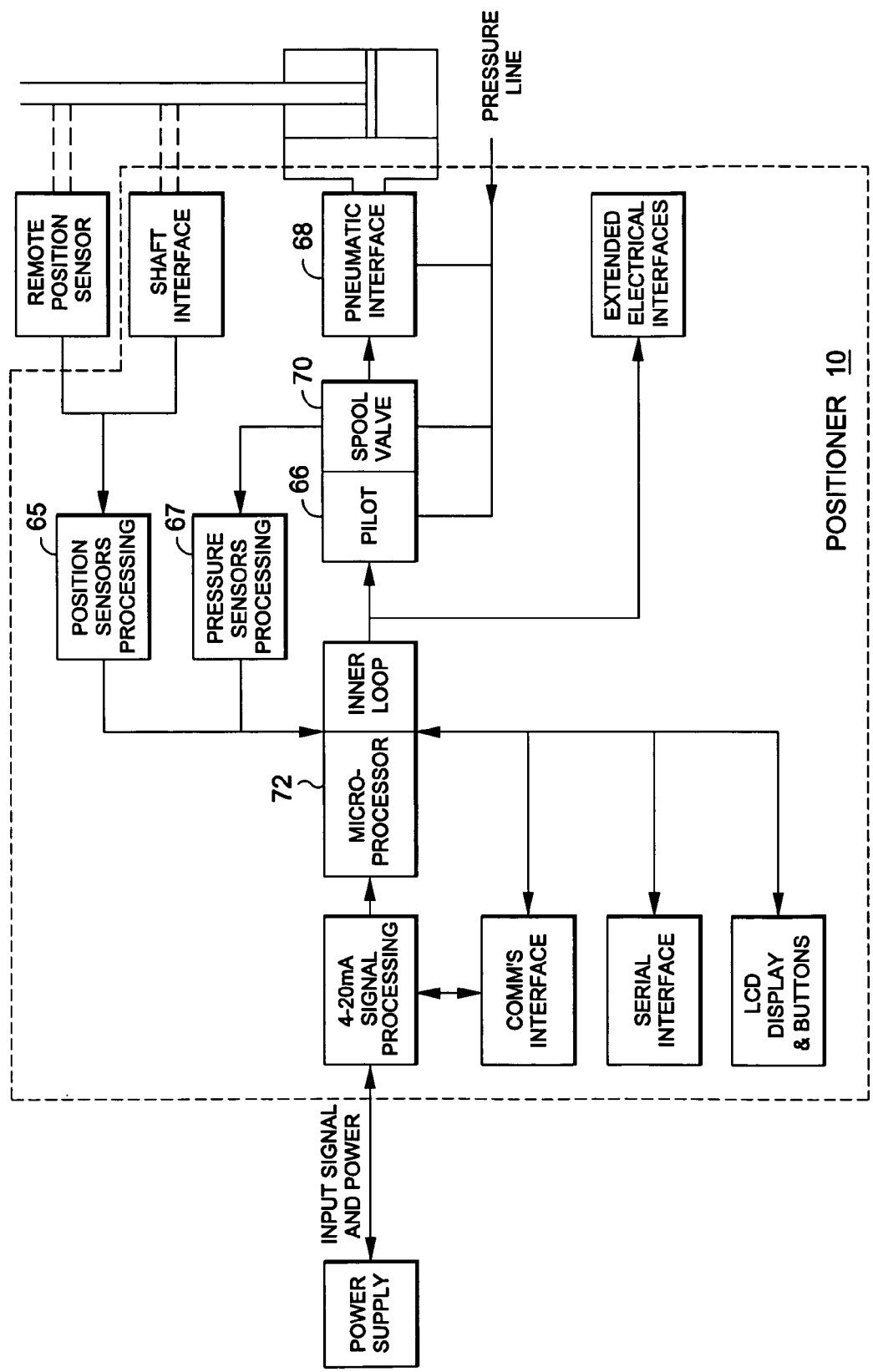
FIG. 11 is a block diagram illustrating the internal functions of the positioner system constructed in accordance with the present invention.

Reference is now made to FIG. 11, a block diagram representative of the internal functions of the positioner 10. The positioner 10 provides increased flow capacity and greater efficiency in comparison to other similarly sized positioners. The positioner 10 is a microprocessor based current-to-pneumatic instrument. The positioner 10 is configured to receive feedback of the valve position and the change in pressure within the actuator. Therefore, the positioner 10 may diagnose itself, the valve, and the actuator to which it is mounted. The positioner 10 receives an input signal (electrical signal) that provides electrical power and a set point indicating where the valve should be located. The set point is a reference value representing the desired value of the process variable being controlled. The input signal may also be referred to as a current signal used by the positioner 10 to drive the actuator and therefore control the valve. The positioner 10 receives power from a two-wire, 4-20 mA input signal.

The input signals can be quantified as a percentage. For example, it is contemplated that a 0% input signal may be defined as the valve's closed position and a 100% input signal is defined as the valve's open position. Using the analog source, the 4-20 mA signal is converted to a percentage. During loop calibration, the signals corresponding to 0% and 100% are defined. For example, loop calibration may provide that 4 mA=0% input signal and 20 mA=100% current signal. In this example, 12 mA represents a 50% current signal. It should be noted that there are a plurality of input signals ranging between 0% and 100%. Pneumatically operated valves depend on the positioner 10 to receive the input signal from a controller and convert the input signal to valve displacement. The input signal instructs the positioner 10 to displace the actuator to a particular position to manipulate the flow of fluid within the fluid circuit. The transducer 54 receives the input signal from the positioner microprocessor 72 and converts it to a pneumatic signal.

The positioner 10 is configured to compare the input signal received to the actuator's position. If the signal and the actuator position differ, the positioner 10 sends the necessary motive force, through compressed air, to displace the actuator until the correct position is reached. This is known as the principle of negative feedback, wherein the control input is compared to the actual position of the mechanical system as measured by a feedback mechanism at the output. Any difference between the actual and wanted values ("error signal") is amplified and used to drive the spool 34 in the direction necessary to reduce or eliminate the error. Electro-pneumatic positioners are capable of converting the current signal to an equivalent pneumatic signal, which can then operate the pilot valve 66 of the positioner 10. Advantageously, the positioner 10 does not rely on a fixed relationship between the input signal and pneumatic signal to generate spool movement. The pneumatic signal is generated by specific algorithms by the positioner microprocessor 72 that drives the pilot valve 66. The pilot valve 66 is a small valve that controls a limited-flow control feed to a separate spool valve 70 which typically controls a high pressure or high flow feed. The pilot valve 66 is useful because it may allow a small and easily operated feed to control a much higher pressure or higher flow feed, which would otherwise require a much larger force to operate. The positioner 10 may further include a pneumatic interface 68 in communication with the spool valve 70. The pneumatic interface 68 is a switch for routing compressed air to the actuator. The pneumatic interface 68 is the interface between the positioner microprocessor 72 and the pneumatic systems of the positioner 10.

The positioner 10 functions similarly to an analog current to pressure positioner. The positioner 10 uses electrical current (4-20 mA) instead of air as the input signal. It differs in that the electronic signal conversion is digital rather than analog.

The positioner 10 includes the positioner microprocessor 72 that implements the control strategy determined by the input signal. The positioner microprocessor 72 is also configured to automatically adjust its output to the actuator to maintain a desired position in proportion to the input signal. As shown in FIG. 11, the positioner microprocessor 72 may be configured to receive feedback from a position feedback sensor 65 and a pressure feedback sensor 67.

The positioner 10 receives the set point from a power source and positions the valve where instructed. The input signal is directed to the PCB assembly 16 where the microprocessor 72 runs a digital control algorithm resulting in an input signal to the transducer 54. The transducer 54 is connected to a supply pressure and converts the input signal into a pressure output signal. The current-to-pressure output is sent to the pneumatic interface 68 assembly. The pneumatic interface 68 is also connected to supply pressure and amplifies the small pneumatic signal from the transducer 54 into a single larger pneumatic output signal used by a single-acting actuator. For double-acting actuators, the pneumatic interface 68 accepts the pneumatic signal from the transducer 54 and provides two pneumatic output signals. The change in pneumatic interface 68 output pressure to the actuator causes the valve to move. Valve position is sensed through the feedback mechanism by the positioner 10 feedback sensors. The sensor is electrically connected to the PCB assembly 16 to provide the feedback signal used in the control algorithm.

It should be noted that the block diagram is provided in simplified form in order to emphasize the elements, functions and software blocks that are relevant to the positioner 10 of the present invention.

In this regard, only those elements that are related to closed-loop control of the spool 34 are included. The inner loop may be controlled by specific hardware. Hardware control of the inner loop prevents any software related delays. Additionally, the spool valve 70 may be controlled by a target change in pressure in the actuator. The target pressure change may be referred to as delta pressure.

Figure 12:
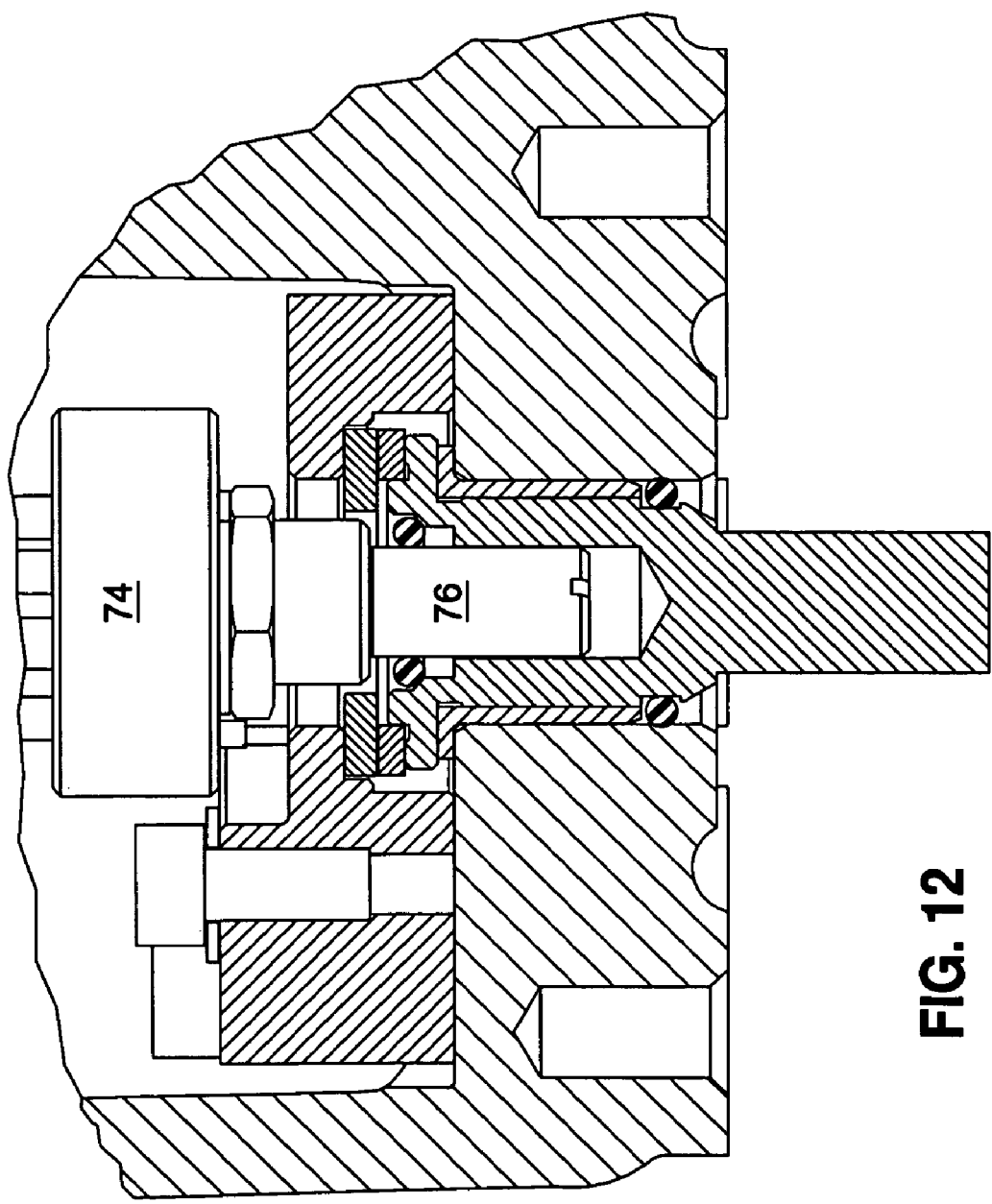
FIG. 12 is a partial cross-sectional view of a feedback mechanism of the positioner system constructed in accordance with the present invention.

Reference is now made to FIG. 12, wherein the feedback mechanism is depicted. The feedback mechanism includes a feedback sensor 74 with an extra-strong feedback shaft guide 76. The shaft 76 includes a long load bearing guide for absorbing any load. The feedback sensor 74 and the feedback shaft guide 76 are coupled to the actuator. The feedback sensor 74 provides a variety of important functions in relation to the positioner 10. The feedback sensor 74 may be configured to determine the actuator's position. However, it is important for the feedback sensor 74 to avoid any small misalignments that can produce lateral or axial load. Lateral or axial load may disturb the feedbacks sensor 74 accuracy as it pertains to the position of the actuator or the change in pressure within the actuator. To avoid small misalignments that can produce side or axial load, the feedback sensor 74 is mounted elastically and independent from the feedback shaft guide 76 and therefore absorbs minimal load for enhanced efficiency and accuracy. The feedback mechanism including the feedback sensor 74 and the feedback shaft guide 76 transmits the actuator position and/or the change in pressure within the actuator to the microprocessor 72 in the form of a feedback signal.

The current signal is compared to the actuator position. If any deviation exists, the positioner microprocessor 72 sends a signal to the inner-loop control (spool-drive) to move the spool 34 accordingly depending on the deviation. The inner-loop quickly adjusts the position of the spool 34. The movement reduces the deviation between the current signal and the actuator position. This process may continue until the deviation is eliminated. With the actuator at the desired position, the spool 34 will be positioned so that no air flow is allowed to either side of the actuator. For example, the positioner 10 may be calibrated such that 12 mA corresponds to zero deviation. At this point, if there is a change in current signal from 12 mA to 16 mA, the positioner 12 sees 16 mA as a 75% input signal. The deviation therefore is 75% (16 mA) minus 50% (12 mA) which equals 25%. With a positive deviation, the positioner microprocessor 72 based upon the control algorithm sends the current signal to move the spool 34 from its present position. As the spool 34 moves, the compressed air is supplied to the actuator and air is exhausted from the actuator. This new change in pressure within the actuator causes the actuator to start moving towards the desired position of 75%. As the actuator moves, the deviation begins to decrease. The control algorithm processed by the positioner microprocessor 72 instructs the positioner 10 to reduce the movement of the spool 34 to an unbalanced position. This process continues until the deviation is eliminated. At that point, the spool 34 is in the balanced, neutral position.

A personal computer (PC) and diagnostic software application may be provided to interface with the positioner 10. The software application provides input to the positioner microprocessor 72. The application may be compatible with either a highway addressable remote transducer (HART) or transistor to transistor logic telecommunications circuits such as TTL RS232. The application provides a user interface for the positioner 10. The software application may obtain results data from the positioner 10 to display results on a monitor or other display device. Various parameters may be inputted to the interface for controlling the positioner 10. The software application may provide the option of setting a plurality of parameters associated with the positioner 10. The plurality of parameters may include low limit percentage, high limit percentage, tight close pressure, tight open pressure, tuning, proportional gain for opening, proportional gain for closing, time for opening, time for closing, intentional dead-band, close velocity limit, open velocity limit, velocity damping factor open, velocity damping factor close, switched control error threshold, sweep pressure, switched control function, actuator position, required actuator position, diaphragm position, current input, and pressure sensors calibration. The parameters disclosed are by way of example and not meant as a limitation of any sort. A parameter such as delta pressure may be inputted into the software interface and used as a monitoring point for the positioner 10 configuration of the actuator.

Thus, as is apparent from the foregoing, the positioner 10 provides the features of a high capacity spool 34 and positioner housing 20 design, control algorithms and hardware, environmental protection, an extra strong feedback shaft 74 and feedback sensor 76 which are protected from load, and a PC interface and diagnostic tool. As a result of the inclusion of these features, the positioner 10 is operative to provide increased $C_v$ capacity without the use of boosters, but still adhere to the 4-20 mA power consumption standard. With particular regard to the control algorithms, the inner loop (spool drive) is controlled by specific hardware, thus enabling no software-related delays as indicated above. The control algorithms also allow exceptional performance, with the inner loop further being controlled by "target delta pressure" as opposed to the use of the spool position or an open loop method. The present invention when compared with positioners having similar spool size provides better frequency response for small signal changes, faster spool stroke time, shorter spool stroke range, and a greater flow ($C_v$) capacity. The positioner 10 includes these inherent characteristics without requiring the use of fitted boosters. By eliminating unnecessary boosters in the present invention, a significant improvement in dynamic performance is achieved, including a very short dead time on small signal changes, and high speed without instability for large signal changes. Further, by eliminating unnecessary boosters in the present invention, piping and fittings which are several causes for malfunctions and/or leakages are eliminated, as explained above. Additionally, the cost savings attributable to the absence of boosters and the related piping, fittings and plumbing is significant. The positioner 10 of the present invention is also easy to calibrate, either in the field or at valve locations, with a significant time savings and hence cost cutting being achieved since no booster adjustments need be made in relation thereto. Even if the high flow of positioner makes the boosters unnecessary for most applications, the positioner is able to drive the boosters. The quality of control, compared to existing low $C_v$ positioner, is better due to the low amplification needed.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention.

What is claimed is:

1. A spool manifold assembly, comprising:
   a manifold housing having a plurality of fluid flow passageways for receiving and exhausting fluid;
   a spool disposed and reciprocally movable within the manifold housing, the spool defining a longitudinal axis and being configured to slide axially along the longitudinal axis to selectively port fluid to the plurality of fluid flow passageways:
   a diaphragm operatively coupled to the spool and configured to displace the spool in accordance with a pressure level exerted on the diaphragm; and
   a flexible shaft having a first end rigidly attached to the spool and a second end rigidly attached to the diaphragm, the flexible shaft extending between the spool and the diaphragm along the longitudinal axis and defining a radially elastic and axially rigid joint therebetween.

2. A spool manifold assembly, comprising:
   a manifold housing having a plurality of fluid flow passageways for receiving and exhausting fluid;
   a spool disposed and reciprocally movable within the manifold housing, the spool defining a longitudinal axis and being configured to slide axially along the longitudinal axis to selectively port fluid to the plurality of fluid flow passageways;

a diaphragm operatively coupled to the spool and configured to displace the spool in accordance with a pressure level exerted on the diaphragm; and a flexible shaft connected to and extending between the spool and the diaphragm along the longitudinal axis, the flexible shaft being adapted to transmit a bidirectional motive force from the diaphragm to the spool.

3. The spool manifold assembly of claim 2, further comprising a biasing spring disposed about the flexible shaft between the diaphragm and the spool, the biasing spring being operative to normally bias the spool to a prescribed position.

4. A spool manifold assembly comprising:
a manifold housing having a plurality of fluid flow passageways for receiving and exhausting fluid;
a tubular sleeve disposed within the manifold housing, the sleeve defining a plurality of apertures for receiving fluid from the fluid flow passageways;
a spool disposed within the sleeve, the spool defining a longitudinal axis and being configured to slide axially along the longitudinal axis to port fluid to the plurality of fluid flow passageways via the plurality of apertures;
a flexible shaft extending along the longitudinal axis, the flexible shaft having a first end coupled to the spool and a second end coupled to a diaphragm which is operatively coupled to and configured to exert a bidirectional motive force on the spool via the flexible shaft in response to a pressure change associated with the diaphragm; and
a biasing spring disposed about the flexible shaft between the diaphragm and the spool, the biasing spring being operative to normally bias the spool to a prescribed position.

5. The spool manifold assembly of claim 4, wherein the spool includes a bore extending axially therein along the longitudinal axis, the bore being configured to partially receive the flexible shaft.

6. The spool manifold assembly of claim 4, wherein a portion of the flexible shaft is disposed within an elongate sleeve which is sized and configured to minimize lateral displacement of the flexible shaft when a compressive force is exerted thereon.

7. The spool manifold assembly of claim 1, wherein the first end of the flexible shaft and the second end of the flexible shaft each define an axially rigid joint.

8. The spool manifold assembly of claim 1, wherein the flexible shaft is radially elastic.

9. The spool manifold assembly of claim 4, wherein the spool is selectively moveable between a neutral position and an unbalanced position, and is operative to prevent the flow of fluid from the fluid flow passageways to an actuator when in the neutral position, the biasing spring normally biasing the spool to the unbalanced position.

10. The spool manifold assembly of claim 9, wherein the spool is configured to allow the flow of fluid from at least one of the fluid flow passageways to the actuator when in the unbalanced position.

11. The spool manifold assembly of claim 10, further in combination with a valve positioner comprising:
a positioner housing having a plurality of fluid flow passageways disposed therein; and
a positioner microprocessor disposed within the positioner housing, the positioner microprocessor being configured to receive an input signal representative of a position of the actuator;

the spool manifold assembly being cooperatively engaged to the positioner housing such that the fluid flow passageways of the manifold housing communicate with corresponding ones of the fluid flow passageways of the positioner housing, the spool being operative to selectively port fluid flow from the fluid flow passageways of the manifold and positioner housings to the actuator, with the diaphragm being disposed within the positioner housing and the positioner further including a transducer in fluid communication with the diaphragm, the transducer being in electrical communication with the positioner microprocessor and configured to receive a pneumatic signal which is operative to regulate the fluid supplied to the diaphragm for displacing the spool.

12. The spool manifold assembly of claim 11, wherein the plurality of fluid flow passageways of the positioner housing are each of a gradually decreasing width as they extend toward corresponding ones of the fluid flow passageways of the spool manifold assembly.

13. The spool manifold assembly of claim 11, wherein the valve positioner further comprises a software interface in communication with the positioner microprocessor and adapted to accept inputs of a plurality of desired variables for the positioner microprocessor to generate a pneumatic signal.

14. The spool manifold assembly or claim 11, further comprising dual exhaust ports disposed within the positioner housing adjacent the fluid flow passageways thereof, the dual exhaust ports being configured to exhaust fluid from the positioner housing.

15. The spool manifold assembly of claim 14, wherein each of the exhaust ports is enclosed by a flexible diaphragm.

16. The spool manifold assembly of claim 11, wherein the positioner microprocessor comprises a set of control algorithms which are operative to compare the input signal to the actuator position and generate a pneumatic signal.

17. The spool manifold assembly of claim 16, wherein the valve positioner further comprises a feedback mechanism coupled to the actuator.

18. The spool manifold assembly of claim 17, wherein the feedback mechanism of the valve positioner comprises:
a shaft for absorbing a load generated by the actuator; and
a sensor mounted elastically and independent from the shall, the sensor being configured so as not to absorb any load generated by the actuator.

19. The spool manifold assembly of claim 18, wherein the feedback mechanism is in electrical communication with the positioner microprocessor, the feedback mechanism being operative to generate a feedback signal representative of a pressure change within the actuator.

20. The spool manifold assembly of claim 19, wherein the positioner microprocessor is operative to process the feedback signal received from the feedback mechanism using the set of control algorithms to generate an updated pneumatic signal.

* * * * *